United States Patent
Myklebust

(10) Patent No.: US 7,007,534 B1
(45) Date of Patent: Mar. 7, 2006

(54) METHODS FOR PRODUCTION OF CONTINUOUS STRETCHES OF CIRCULAR CYLINDRICAL MEMBERS, TOOLS, USE OF A TOOL, A LENGTH OF PIPE AND PIPE PARTS

(75) Inventor: Terje E. Myklebust, Fosnavåg (NO)

(73) Assignee: Skipskonsult AS, Gurskoy (NO)

( * ) Notice: Subject to any disclaimer, the term of this patent is extended or adjusted under 35 U.S.C. 154(b) by 0 days.

(21) Appl. No.: 09/979,181

(22) PCT Filed: May 19, 2000

(86) PCT No.: PCT/NO00/00161

§ 371 (c)(1),
(2), (4) Date: Nov. 20, 2001

(87) PCT Pub. No.: WO00/71276

PCT Pub. Date: Nov. 30, 2000

(30) Foreign Application Priority Data

May 21, 1999 (NO) ..................................... 992476

(51) Int. Cl.
*G06F 9/455* (2006.01)
*G01C 1/00* (2006.01)
*G01B 5/25* (2006.01)

(52) U.S. Cl. .......................... 72/149; 72/15.1; 72/307; 33/343; 33/371; 29/819; 364/512; 703/1

(58) Field of Classification Search .................. 33/371, 33/343; 29/819; 72/149, 150, 15.1, 15.2, 72/14.9, 307; 364/512; 703/1
See application file for complete search history.

(56) References Cited

U.S. PATENT DOCUMENTS 2,735,190 A * 2/1956 Jordan et al. .................. 33/332
3,038,261 A * 6/1962 Blain ........................... 33/529
3,245,201 A * 4/1966 Richardson ................... 33/529

(Continued)

FOREIGN PATENT DOCUMENTS

CA      970 962      7/1975

(Continued)

*Primary Examiner*—David B. Jones
(74) *Attorney, Agent, or Firm*—Jenkens & Gilchrist, P.C.

(57) ABSTRACT

The present invention regards methods of projecting, producing and bending continuous stretches of circular cylindrical bodies, such as stretches of piping, handrails and rails for stair lifts. The invention also regards a tool for use with the method, application of a tool, and a length of pipe and fittings prepared for use with the method. During the project planning, the orientation of the fitting (52) is given in relation to the first piece of pipe (50), by the cut angle of the fitting (52) and the rotational angle (δ) of the fitting about the longitudinal axis of the pipe (50) relative to a defined spatial direction gen by a mark (53, 54) on the piece of pipe (50) and the fitting (52). During construction, the piece of pipe (50) is arranged with one side in a defined spatial direction, the fitting (52), which has a given cut angle, is fitted to the piece of pipe (50) and the fitting (52) is rotated through a predetermined rotational angle (δ) that is measured relative to the defined spatial direction. A tool (70) with an angle gauge (74) is used to measure the rotational angle (δ). This angle gauge may be electronic. When bending lengths of pipe, a bending tool (60) is used, which tool is equipped with an angle gauge (66) for measuring the rotational angle of the length of pipe (61) about the longitudinal axis. A system for determining construction method and construction is also described.

13 Claims, 10 Drawing Sheets

U.S. PATENT DOCUMENTS

| | | | |
|---|---|---|---|
| 4,625,531 A | 12/1986 | Lafrasse et al. | 72/150 |
| 4,831,546 A * | 5/1989 | Mitsuta et al. | 703/1 |
| 5,315,522 A * | 5/1994 | Kauffman et al. | 72/307 |
| 6,041,171 A * | 3/2000 | Blaisdell et al. | 703/1 |
| 6,505,412 B1 * | 1/2003 | Hauzie, Jr. | 33/529 |
| 6,532,675 B1 * | 3/2003 | Letourneau | 33/529 |

FOREIGN PATENT DOCUMENTS

| | | |
|---|---|---|
| DE | 298 22 631 U1 | 4/1999 |
| GB | 1116612 | 6/1968 |

* cited by examiner

METHODS FOR PRODUCTION OF CONTINUOUS STRETCHES OF CIRCULAR CYLINDRICAL MEMBERS, TOOLS, USE OF A TOOL, A LENGTH OF PIPE AND PIPE PARTS

The present invention regards methods of projection, production and bending of continuous stretches of circular cylindrical bodies, e.g. stretches of piping, hand rails and rails for stair lifts. The invention also regards a tool for implementing the method and an application of a tool, a stretch of piping and fittings prepared for use with the method, along with a system for determining the construction method and construction parameters.

Each year, a countless number of kilometres of piping is laid on board ships, on offshore installations, in factories and other buildings. Considerable proportions of these stretches of piping extend across several levels and collectively present a very complicated shape. In particular on board ships, where conditions are often crowded and making the best possible use of the available space is of great importance, piping is laid at varying angles that often differ from straight angles. This is done in order to be able to lay the pipes as close to the bulkheads and ship's side as possible. As a result, laying pipes on board ship is a very complicated task. Mistakes are often made, causing smaller or larger amounts of piping to be scrapped.

In order to facilitate this work, a method has been in use over the last 20 years that involves the use of isometric drawings in order to show the stretch of piping with all its straight pieces of pipe and all the bends. This method has spread and gained recognition. Using this method, the centreline of the pipe is drawn, and the spatial positioning of straight pieces of pipe is indicated by means of the co-ordinates in the xyz direction of one end of the pipe in relation to the other end of the pipe. A bend is indicated by means of its cut angle, i.e. the angle across which the bend extends.

In FIG. 1, the principle of such isometric drawings is shown. The centreline of the stretch of piping is drawn at 1. The stretch of piping can here be seen to come in along the y axis at the left hand side of the figure and be bent through a bend 2, through an angle that goes up and to the left relative to the y axis, at an angle κ, which is the cut angle. The cut angle for a bend will always be given. A bend can be produced with a very accurate cut angle, or pipes may be bent to an equally accurate angle of bending. From the bend 2, the stretch of piping extends through a length L, before being deflected again at a bend 3. The position of the bend 3 is given in relation to the position of the bend 2, using co-ordinates x, y and z.

In FIG. 3, it has been illustrated how a stretch of piping may be shown by an isometric drawing.

Although such an indication of positioning for the stretch of piping is unique, in practice it is still not that simple to lay pipes according to a drawing of this type. Returning to FIG. 1 and imagining that the stretch of piping has been laid up to the bend 2, and that the pipe with length L is about to be laid, it would be logical to mark the point using co-ordinates x, y and z, and then aim the pipe with length L at this point. In practice however, the point xyx will be located in thin air, and it will be difficult, if not impossible to mark. The pipelayer will therefore have to aim the pipe at what he can only assume to be the location of the point xyz. This will leave room for mistakes. Since the pipe that follows after the next bend, bend 3, is to be oriented on the basis of co-ordinates which have their origin at the bend 3, an inaccuracy in the placement of the bend 3 will be carried over to the orientation of the pipe that follows the bend 3. In this manner, inaccuracies will constantly add up, and may in many cases lead to the stretch of piping ending up with a completely different positioning from that which was intended. Especially on board ships, on offshore installations and in factories, a offset position for the stretch of piping may have serious consequences. In this case, poor utilisation of the space is the least of the worries. Among the more serious consequences is that of being left with insufficient space for the equipment that is to be positioned after the piping has been laid, that of not allowing other stretches of piping to be laid according to plan, that of necessitating dismantling and reconstruction of large parts of the piping, and that of causing great delays during construction, which staggers other construction processes.

In order to remedy any inaccuracies that are discovered during construction, the pipelayer will often adjust the stretch of piping by adding extra bends and/or cutting pieces of pipe. This often entails welding of pipes or insertion of extra unions, which may later cause problems with leakage, which is particularly serious if the extra join ends up in a place that later becomes very inaccessible. Using today's technology, it is practically impossible to bend pipes accurately in more than one plane, i.e. all bends must be in the same plane.

From prior art is known a tool, described in CA 970962, which is used to determine the centreline through a pipe. The tool consists of a graduated element shaped as a quarter circle and an angular element attached to the graduated element. The angular element is equipped with a level.

A pipe bending machine is known from US 4625531. By using this machine, it is possible to bend subsequent bends that have been rotated through 180° relative to each other. However bending of bends that have been rotated through an arbitrary number of degrees is not described.

In order to avoid the above problems and other problems associated with the known methods of producing stretches of piping, a method has been provided for production of a stretch of piping, which method is based on an isometric drawing and makes use of other parameters than the xyz co-ordinates in determining the orientation of pieces of pipe.

In a first aspect, the invention regards a method of projecting a stretch of piping or similar, in which the stretch of piping comprises at least one piece of pipe and a fitting, and which is characterised in that the orientation of the fitting is given relative to the first piece of pipe in terms of the cut angle of the fitting and the rotational angle of the fitting about the longitudinal axis of the pipe, relative to a defined spatial direction.

In a second aspect, the invention regards a method for production of a stretch of piping or similar, in which the stretch of piping comprises at least one fitting and a second piece of pipe, and which is characterised in that the piece of pipe is arranged with one side in a defined spatial direction; the fitting, which has a given cut angle, is fitted to the piece of pipe and the fitting is rotated through a predetermined rotational angle, by the rotational angle being measured relative to the defined spatial direction.

In a third aspect of the present invention, it regards a method of producing at least parts of stretches of piping or similar through bending, in which a bend is bent on a length of pipe, and which is characterised in that the bend is bent to a given angle of bending and with a predetermined rotational angle that is measured relative to a defined side of the length of pipe, and which is to face in a defined spatial direction upon assembly of the length of pipe.

The invention also regards a length of pipe for production of at least parts of a stretch of piping or similar, and is characterised in that it comprises a mark along one side parallel to the longitudinal axis, which mark is to face in a defined spatial direction upon assembly of the length of pipe.

The invention further regards a fitting for joining with pieces of pipe and/or fittings, for production of a stretch of piping or similar, which fitting comprises two or more legs, and is characterised in that the fitting comprises a mark at least at or near the end of each of its legs, which mark is to face in a defined spatial direction upon assembly of the fitting.

The invention also regards application of a tool for use in production of a stretch of piping or similar, comprising a means of measuring an angle along the circumference of a piece of pipe or a fitting with a circular cross section and a means of determining a reference plane, for measuring the rotational angle of another piece of pipe or another fitting to be connected.

Furthermore, the invention regards a tool comprising a means of measuring an angle along the circumference of a piece of pipe or a fitting with a circular cross section and a means of determining a reference plane, and is characterised in that the means of measuring an angle and the means of determining the reference plane comprise an electronic circuit with an electronic level and angle gauge.

The invention also regards a tool for bending lengths of pipe, and is characterised in that it is provided with an angle gauge for measuring the rotational angle of the length of pipe about the longitudinal axis.

Finally, the invention also regards a system for determining the choice of construction method and construction parameters when producing a stretch of piping, characterised by a first storage device for production restricting parameters, which contains production restricting parameters such as bend radius and structural dimensions of flanges for available parts, maximum bend radius, minimum gripping length and maximum length of pipe between bends for a bending machine, a second storage device for input of site specific parameters such as available length in the X direction, available length in the Y direction, available length in the Z direction, direction of incoming connection and direction of outgoing connection, a third storage device for input of optional parameters such as the desired deviation for the stretch of piping, an evaluation unit for, on the basis of said parameters, establishing whether or not the conditions for bending the stretch of piping and/or producing this from assembled parts are right, a calculation unit that, on the basis of the stored parameters, determines the construction parameters for the stretch of piping, such as bending/cut angles and rotational angles for bends, as well as lengths of straight lengths of pipe, and a display or print unit for display of said bending/cut angles, rotational angles and lengths, preferably in the form of a graphic representation of the stretch of piping.

Further embodiments of the invention are given in the dependent claims.

The present invention provides many advantages. Among these are:

The work becomes easier, and the demands placed on the person doing the work are less stringent. Specialists with lower qualification requirements may be used.

Less time consuming. In many cases, one operative may be used instead of two, for the same task.

A considerable increase in accuracy.

The consumption of materials is reduced, due among other things to fewer mistakes.

Allows a greater degree of prefabrication.

An increase in productivity and job satisfaction.

The principles of the present invention may be implemented without costly changes or expensive new equipment. The method is also easy to learn. The existing isometric drawings may still be used, with only minor changes.

The invention will now be explained in greater detail with reference to the accompanying figures, in which.

Figure 4:
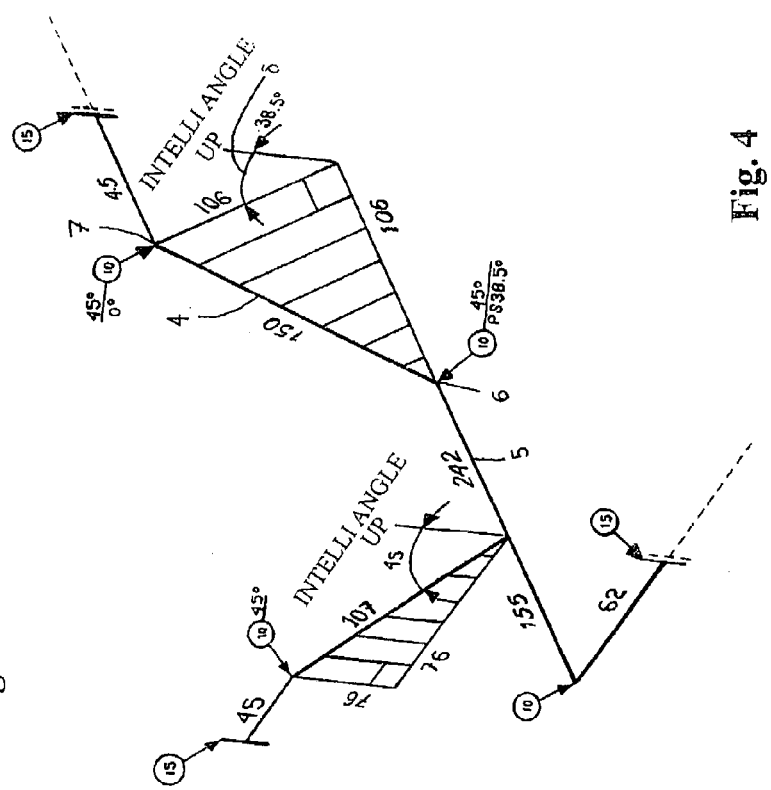
Figure 5:
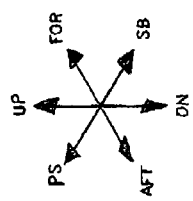
Figure 7:
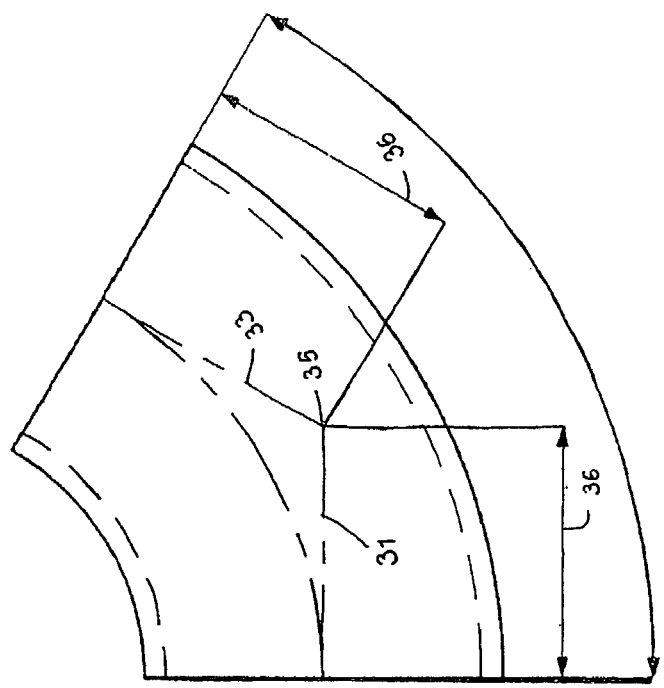
Figure 8:
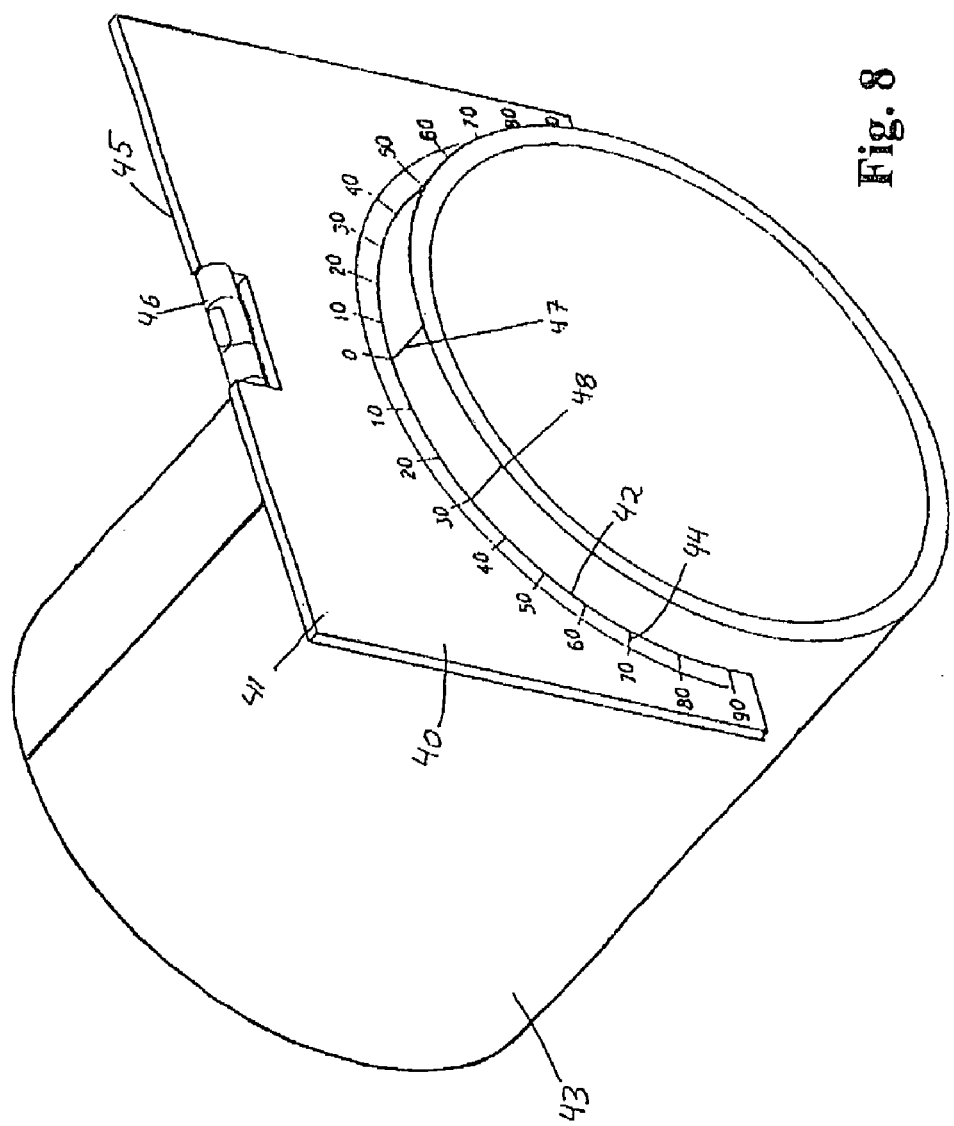
Figure 9:
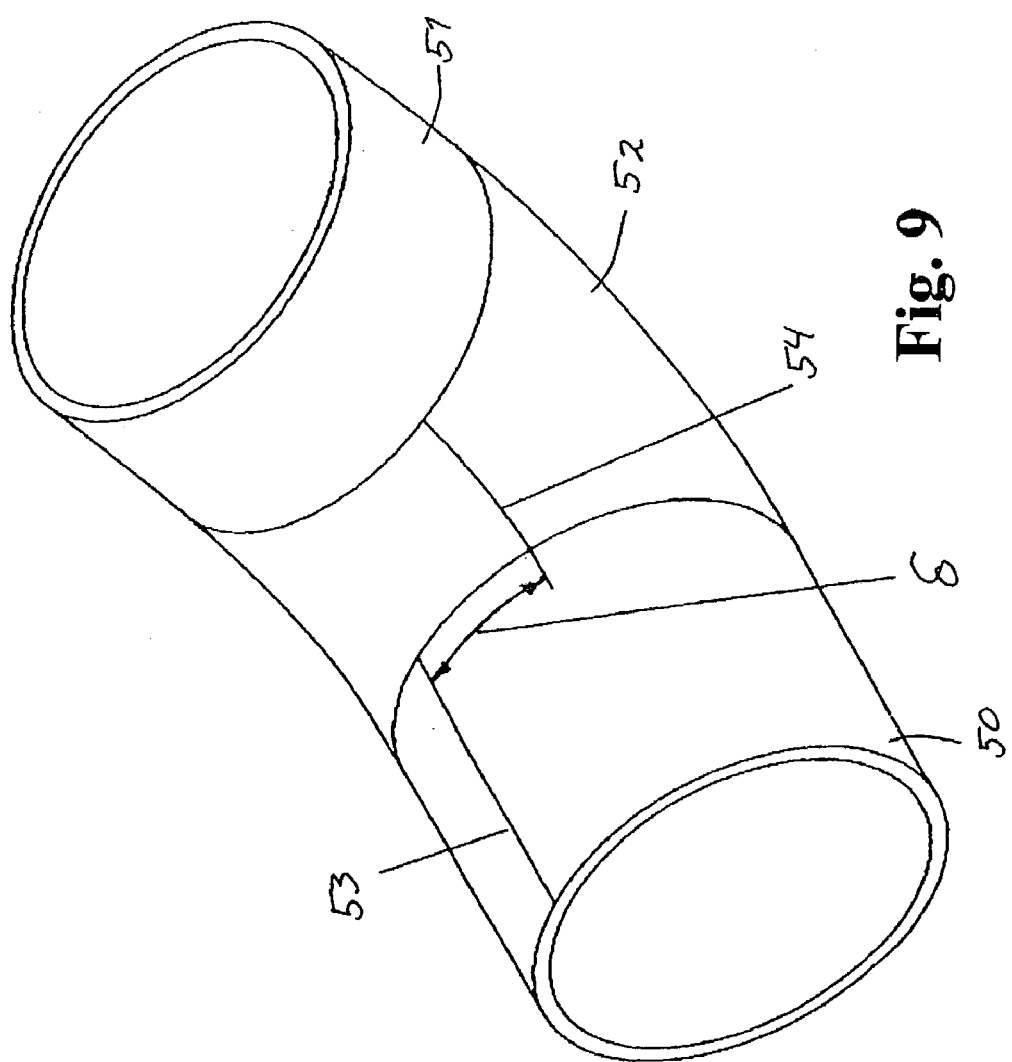
Figure 12:
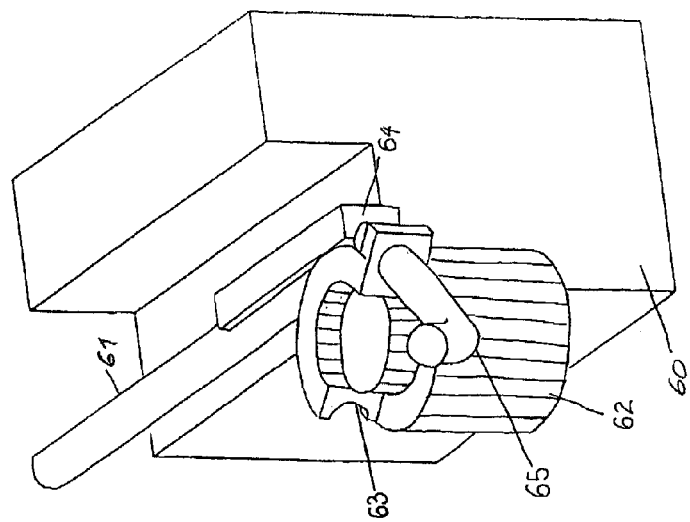
Figure 13:
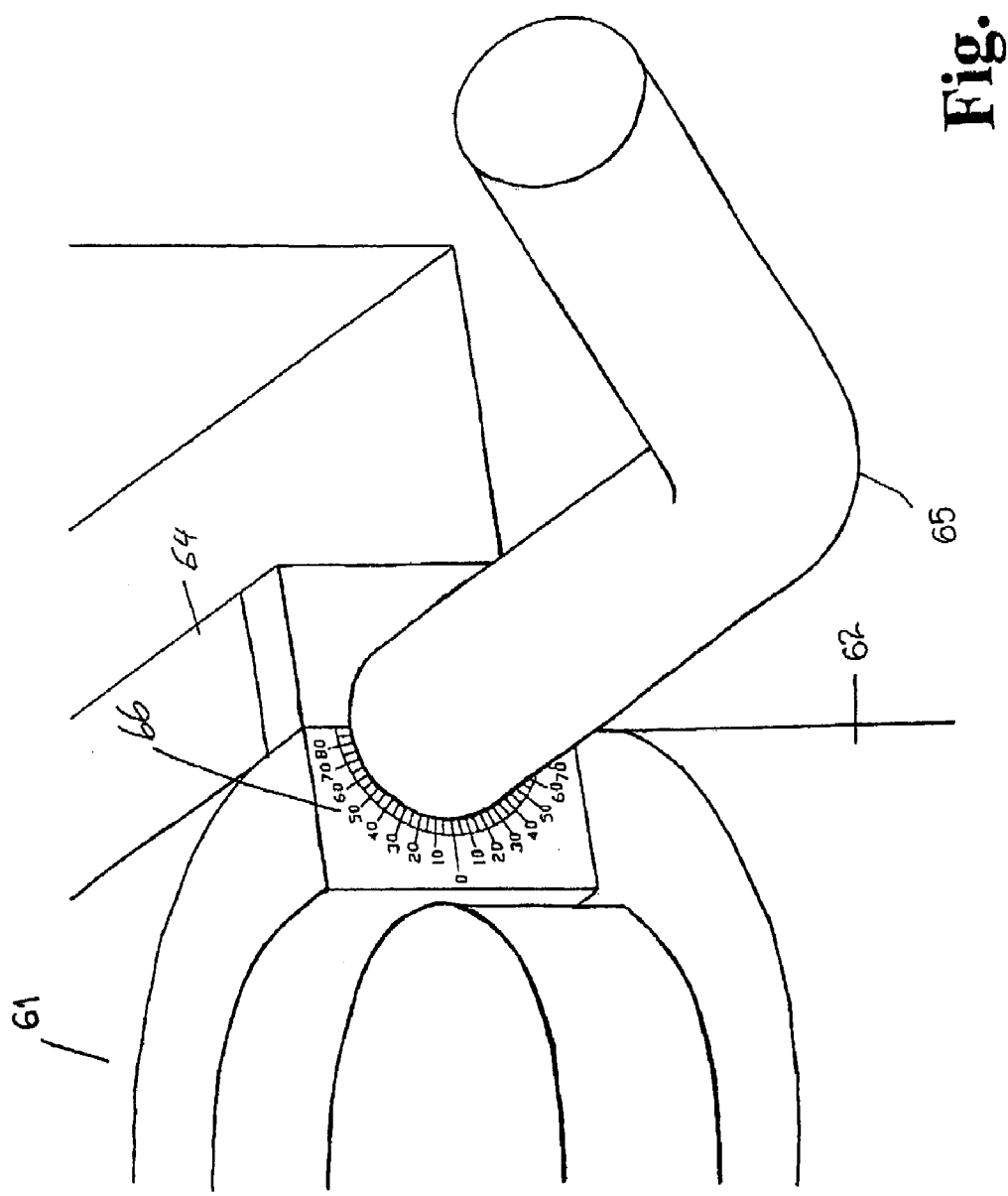
Figure 14:
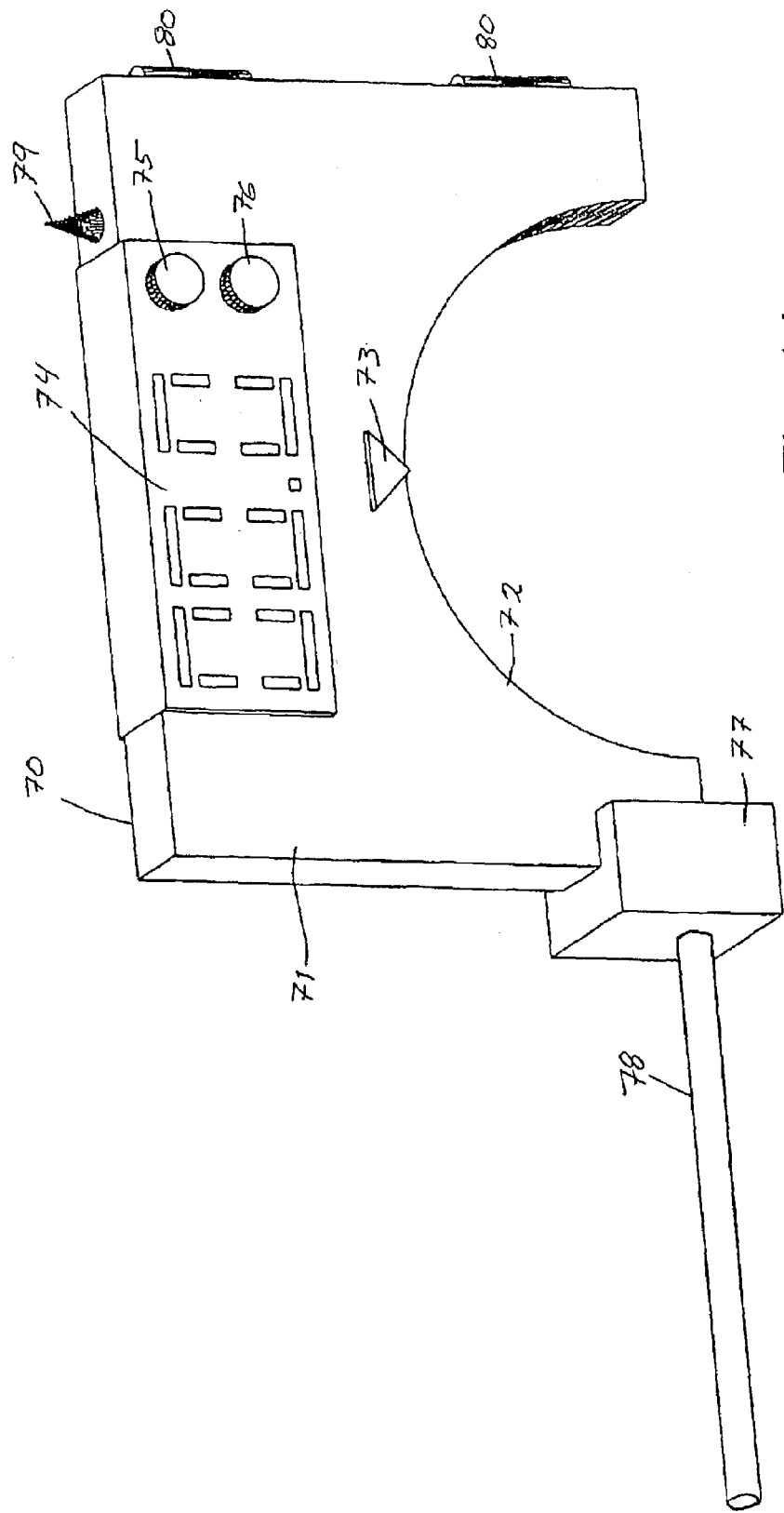
Figure 15:
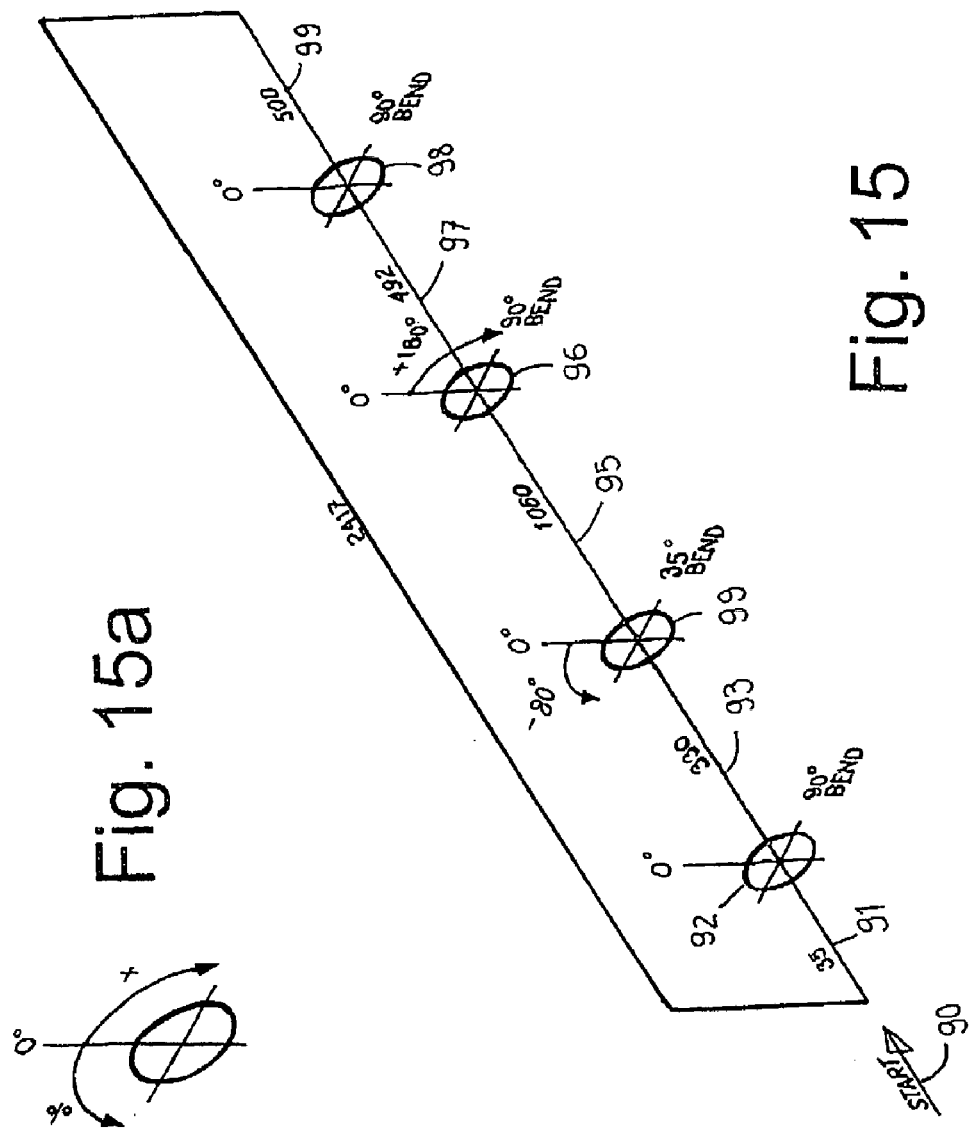
Figure 16:
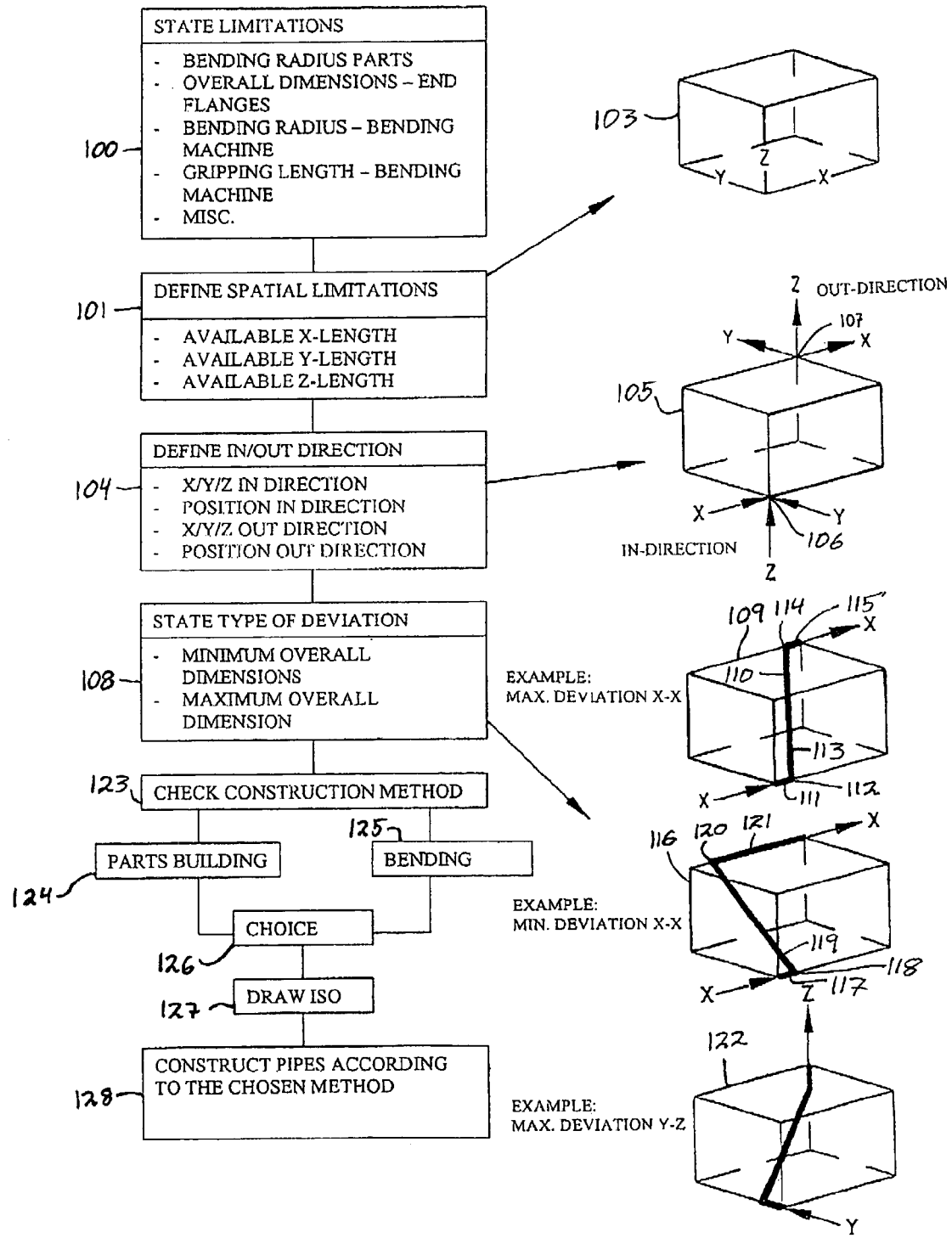

FIG. 4 shows a projected stretch of piping according to the method of the present invention, FIG. 5 shows the "points of the compass" for the diagrams in FIGS. 3 and 4, FIGS. 6 and 7 show two bends with different cut angles and how the centreline is defined through these, FIG. 8 shows a tool for measuring rotational angle, FIG. 9 shows a piece of pipe and a bend assembled at a given rotational angle, FIGS. 10–13 show bending of pipes in a bending machine, FIG. 14 shows a tool according to the present invention, FIG. 15 shows an alternative way of representing a stretch of piping graphically in accordance with the present invention, FIG. 15a shows a symbol for specification of rotational angle, and FIG. 16 illustrates a system for determining the choice of construction method and construction parameters.

Figure 1:
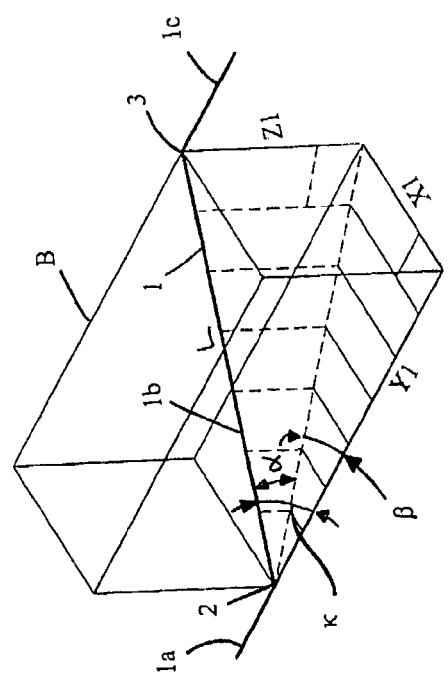
FIG. 1 illustrates a known method for production of a stretch of piping.

In FIG. 1, the principles of the known isometric method of producing a stretch of piping are shown. The centreline of the stretch of piping is drawn as a thick line at 1. In the figure, the stretch of piping consists of a first piece of pipe 1a, a second piece of pipe 1b and a third piece of pipe 1c. The pieces of pipe 1a and 1b are joined via a bend 2, and the pieces of pipe 1b and 1c are joined via a bend 3. The bend 2 has a predetermined cut angle κ. The bend is normally produced with this cut angle in advance, and as such the cut angle is extremely accurate. The piece of pipe 1b has a length L, and is also cut in advance. From the figure, it can be seen that the piece of pipe 1b is to be joined with the piece of pipe 1c at a point located at the co-ordinates x1, y1, z1 in a system of co-ordinates with its origin in the bend 2. The co-ordinates x1, y1, z1 form the sides of an imaginary parallelepipedic box B with right angles, where the piece of pipe 1b forms the diagonal between two of the opposite corners of the box, where the bend 2 is in one corner and the bend 3 is in the opposite corner. With this orientation of the piece of pipe 1b, the cut angle κ may be resolved into an angle β that lies in the horizontal plane, and an angle α that lies in the vertical plane. The angles α and β are not given in the drawing but may be calculated by use of a well-known arrangement of formulae. Pipelayers have developed various techniques for aligning pieces of pipe in the xyz direction. Placing marks on walls and floors and aiming for these, and the use of conventional spirit levels in order to determine the most common angles, for instance 45°, are among these. However all these techniques entail a high degree of uncertainty, and errors are carried over from one bend to the next, adding up so that the resulting error may end up being quite large.

Figure 3:
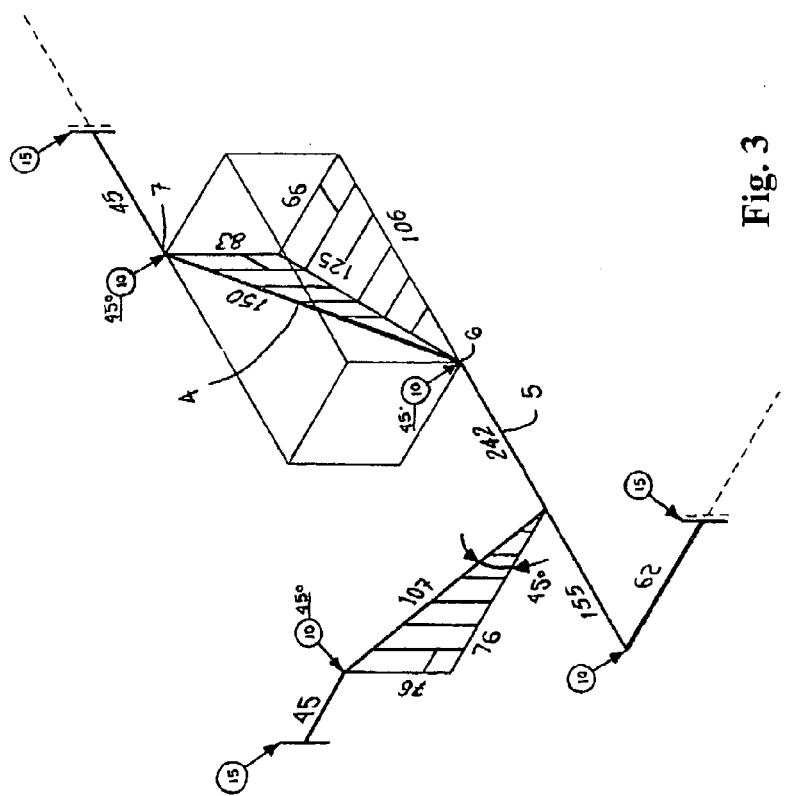
FIG. 3 shows a projected stretch of piping according to the known method.

FIG. 3 shows a stretch of piping represented by the dimensions that are used with the known method. For instance, it may be seen that the length of 150 mm is given for the piece of pipe 4. The piece of pipe forms a cut angle of 45°, in a bend 6, with the adjoining piece of pipe 5, and the piece of pipe 4 is to extend to a bend 7 that is 125 mm horizontally and 83 mm vertically from the bend 6. The vertical distance of 83 mm constitutes the height of the imaginary box, and the measurements of the base of the box are 106 mm and 66 mm.

Figure 2:
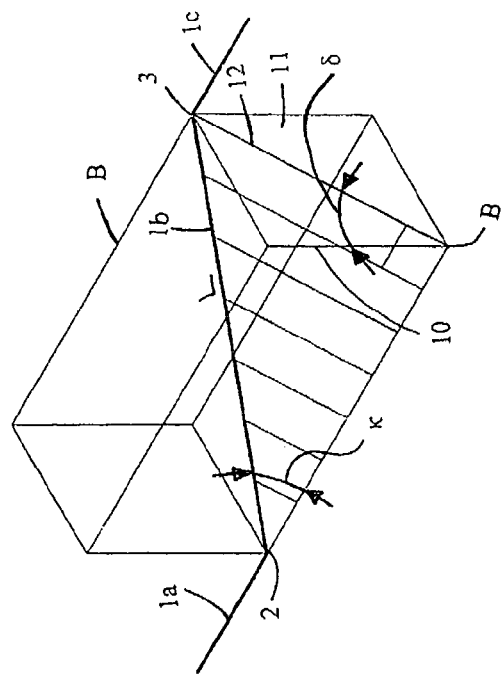
FIG. 2 illustrates the principles of the present invention.

FIG. 2 shows the principle of the method according to the present invention. This also has an imaginary box B drawn around the piece of pipe 1b. This is done to make the comparison with the known method of FIG. 1 easier, however the measurements of the sidewalls of the box are actually completely without interest when using the new method according to the present invention. The cut angle ic is however still of interest. In FIG. 3 is also drawn another angle, the angle δ. The angle δ is the angle between the vertical edge 10 of the box B, at the end face 11 opposite the bend 2, and on the opposite side in relation to the bend 3, and the diagonal 12 of the end face between the bend 3 and the corner 13 opposite the bend 3 on the end face I. Put differently, the angle δ is the rotational angle between the piece of pipe 1a and the piece of pipe 1b.

FIG. 4 shows the same stretch of piping as in FIG. 3 but here presented by means of the principles of the present method. Looking at the piece of pipe 4 again, it can be seen that the cut angle of the adjoining bend 6 is also here given as 45°. In addition, the 38,5° rotational angle of the bend 6 is given. The 106 mm edge and the 106 mm diagonal of the end face of the imaginary box is also given in the figure, in order to illustrate the rotational angle. However it is not necessary to give these measurements in order to produce the stretch of piping. Although it is most practical to produce the stretch of piping in an isometric drawing, it is obviously also possible to produce it in other ways, e.g. in a plan drawing or as a table.

Even though the principles of the invention in the above and in the following have been described in connection with advanced forms of pipework construction, these principles may also, possibly in a modified version, be used in traditional plumbing in order to ensure and keep control of the correct angles in pipe bends and similar.

Figure 6:
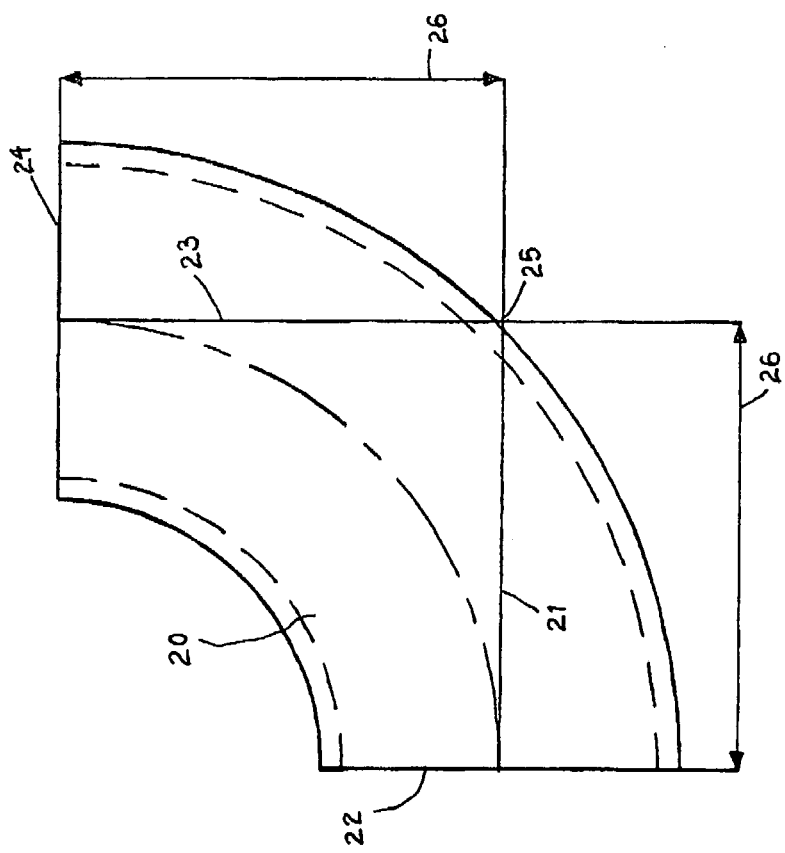

In FIGS. 6 and 7, two bends have been shown in order to illustrate how the centreline is defined through a bend. The bend 20 in FIG. 6 has a cut angle of 90°. A first centreline 21 extends normally to the cross section at the first opening 22 of the bend 20, and goes through the bend 20 until it meets a second centreline 23, which extends normally to the cross section at the other opening 24 of the bend 20. In this case the crossing point 25 between the two centrelines will fall outside of the bend 20. The distance 26 between the crossing point 25 and the openings 22 and 24 respectively is the overall length of the bend.

FIG. 7 shows a bend 30 with a cut angle of 45°. Here, the crossing point 35 falls between centrelines 31 and 33 inside of the bend 30. The overall length 36 of the bend 30 is shorter than the overall length 26 of the bend 20.

FIG. 8 shows a tool 40 that can be used to produce a stretch of piping in accordance with the method of the present invention. The tool consists of a plate 41. A curved cutout 42 is formed in the plate 41, which cutout has approximately the same radius of curvature as a pipe 43, on which the tool is to be used. A graduated degree scale 44 is provided along the cutout 42, with 0° halfway along the cutout 42. A level is placed in one of the edges 45 of the plate 41, parallel to the line tangential to the cutout at 0°. The level is a liquid-filled tube with a small air bubble. The level 46 is used to determine the horizontal plane.

By letting a mark 47 along the pipe 43 be flush with 0° when the level 46 is in the horizontal plane, the mark 47 may be oriented upright. Any angle along the circumference of the pipe 43 may be measured on the basis of this mark 47. In the figure, a mark 48 is has been left at 30°.

In FIG. 9 there is shown a part of a piece of pipe 50 and a piece of pipe 51. A bend 52 is arranged between these in such a manner that the bend 52 joins the pieces of pipe 50 and 51. A mark 53 is made on the piece of pipe 50. This mark is a line extending along the entire piece of pipe 50, parallel with its longitudinal axis. A similar mark 54 is made on the bend 52. The mark 53 is shaped so as to be oriented in a set direction, preferably upwards. The mark 54 is arranged along the shortest side of the bend 52. I.e. if the mark 54 is also turned upwards, the leg of the bend 52 to which the piece of pipe 51 is joined will also face upwards. In order to effect the rotational angle δ between the piece of pipe 50 and the piece of pipe 51, the mark 54 is rotated through the number of degrees that corresponds to the angle δ from the mark 53. The exact rotational angle is measured e.g. by use of the tool 40 in FIG. 8.

Figure 11:
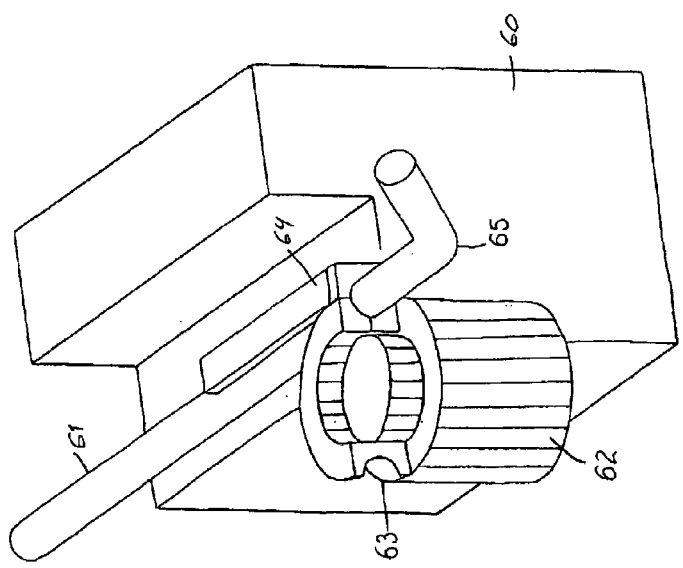
Figure 10:
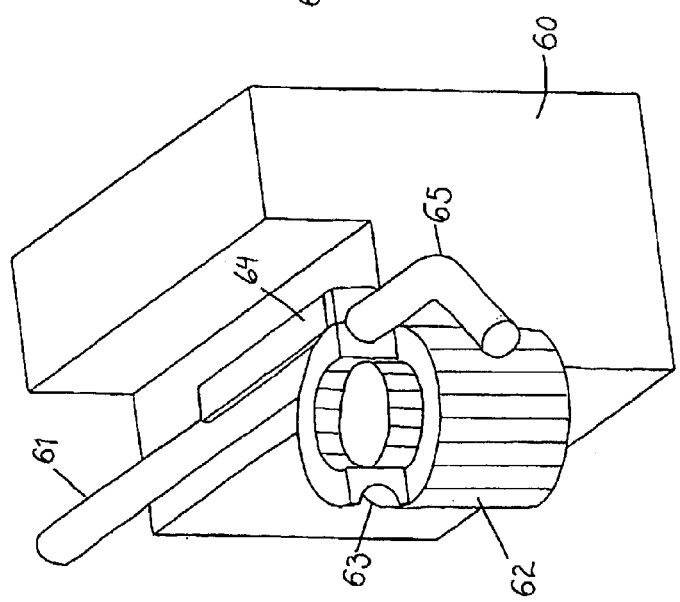

FIGS. 10–12 show a bending machine 60 for bending a length of pipe 61. The bending machine 60 comprises a bending head 62 equipped with a groove 63 and with a curvature corresponding to the curvature of the pipe 61. The bending machine 60 also comprises a retaining jaw 64. When the length of pipe 61 is to be placed in the machine, the retaining jaw 64 and the bending head 62 are first pulled apart, so that the pipe may be inserted between these. Then the retaining jaw 64 and the bending head 62 are brought together around the pipe 61. In order to bend the pipe 61, the bending head 62 is rotated through a certain angle about its rotational axis as shown in FIG. 12. This angle of bending corresponds to the cut angle on separate bends.

In FIG. 10, the length of pipe 61 has been mounted in the bending machine 60. A bend 65 has already been bent in a previous bending process. The new bend is to have a specific rotational angle relative to the existing bend 65, which rotational angle is given in the project drawings, e.g. as shown by bend 6 in FIG. 4. The length of pipe may be pre-equipped with a longitudinal mark defining 0° rotation. In order to give the new bend the correct rotational angle, it is merely necessary to rotate the length of pipe through the correct number of degrees about the longitudinal axis. For this purpose, the bending machine may, as shown in FIG. 13, be provided with a graduated degree scale 66, for instance on the retaining jaw 64 and/or the bending head 63. By this method, it is no longer necessary to think of the direction, in which the previous bend extends, as the correct rotational angle will always be given as a set number of degrees from the 0° mark. An arbitrary number of bends in any direction may thus be bent with great accuracy onto a continuous length of pipe. The requirement for jointing of pipes will therefore be greatly reduced.

By the above method, it is no longer necessary to think of where in the room a bend should be located. The spatial position of the bend is given by the rotational angle δ and the length L of the piece of pipe. The dimensions of the box B are therefore no longer of interest, and a graphical representation of the stretch of piping may be produced by stating only the cut angle κ the rotational angle δ and the length L of the piece of pipe.

By the method according to the present invention there will always be a reference line oriented in a set direction. This direction is preferably upwards, and the pipes and bends are pre-equipped with a mark that should face upwards during assembly. When a bend is to be joined to this piece of pipe with one leg, the bend is rotated about the longitudinal axis of the piece of pipe, through the number of degrees given by the rotational angle of the bend. The pipelayer will then know that the other leg of the bend is pointed in the desired direction, and the next piece of pipe will end up exactly in the intended position.

Any errors that occur will no longer propagate to the next bend, as the rotational angle of the bend is always measured from one set spatial direction and not oriented relative to the end point of the previous piece of pipe.

In FIG. 14, there is shown a tool 70 according to the present invention. The tool comprises a plate 71 in which is formed a cutout 72. A mark 73 has been made halfway along the cutout, which mark defines zero. The tool also comprises an electronic level with a display 74. The electronic level may be set to zero in an arbitrary angular position by use of a push button 75, and may thereby define 0° in any angular position. By using another push button 76, the level may be reset so that the angle shown in the display is relative to the horizontal plane. The electronics in such electronic levels are well known to a person skilled in the art, and will therefore not be described in greater detail herein.

When the electronic tool is used, it is rotated from the zero mark on the pipe until the correct rotational angle shows in the display. At this point, the mark 73 will be at the correct rotational angle, and a bend may be fitted at this angle. The possibility of setting the display to zero also makes it possible to measure relative angles, i.e. differences in angles. This may in some cases be appropriate. It may also be appropriate to store the angles in an internal memory.

The tool 70 is also equipped with a laser 77 that emits a laser beam 78, for example with the same angle relative to the horizontal plane as that shown by the electronic level. Instead of a tool provided with a cutout that is matched to one pipe diameter, it is also possible to produce a tool that can be used with several pipe diameters. In an embodiment (not shown) this tool may for instance have two legs set at right angles to each other. The tool is placed against the pipe in such a manner that each leg abuts the pipe at one point. The tool zero is where the legs meet. By an electronic tool, it will be possible to determine the rotational angle by rotating the tool from the initial position until the correct rotational angle shows in the display, and mark the point on the pipe directly opposite the tool zero.

In order to mark pipes that are not pre-equipped with a longitudinal mark for definition of 0°, the tool 70 is equipped with a scriber 79. The tool is also equipped with rollers 80 along one edge. The distance between the outer edge of the rollers 80 and the scriber 79 corresponds to the radius of a pipe with the same curvature as that of the cutout 72. By placing the pipe on a support and passing the tool 70 along the pipe with the rollers 80 against the support and the scriber against the pipe, a mark may be made along a pipe.

As an electronic level is relatively expensive, it may be appropriate for this to be moveable from the plate 71 to other plates with a cutout of a different radius of curvature, matched to pipes of a different diameter. It is also appropriate for the level to be moveable to a conventional straight level, a reel or other. If so desired, the entire plate 71 with the level may be fitted to another tool.

FIG. 15 shows an alternative way of presenting a stretch of piping graphically, which may be used instead of the depiction in FIG. 4. The advantage of the manner of presentation in FIG. 15 is that it requires less space, is simpler to read and gives direct information that is easy to communicate. It makes it easier to utilise information without conversions, and it is not necessary to consider the shape of the stretch of piping.

Instead of drawing a bend as an angle, it is in FIG. 15 given only by stating the angle of bending/cut angle for the bend in number of degrees. The rotational angle is also given as number of degrees and direction of rotation from the reference direction (up). In FIG. 15a, a symbol is shown that illustrates the principle of specifying the rotational angle for bends. + signifies that the bend rotates in the clockwise direction seen in the direction from the starting point of the stretch of piping towards the destination point.− signifies rotation of the bend in the anti-clockwise direction. Degrees are counted from the upward direction.

The arrow 90 indicates the starting point and the direction of advancement for constructing the stretch of piping. A symbol corresponding to FIG. 5 will normally also be added to the drawing in order to define the direction relative to the ship or the building in which the stretch of piping is to be installed. In the example shown in FIG. 15, the first element of the stretch of piping is a straight length of 35 mm pipe 91. Then follows a 90° bend 92 that points straight up (rotation 0°), the next element is a straight length of 330 mm pipe 93, followed by a 35° bend 94 that has been rotated through 90° in the anti-clockwise direction (i.e. pointing to the left seen in the direction of construction). After this follows a straight length of 1060 mm pipe, followed by a 90° bend 96 that has been rotated through 180° (i.e. points straight down), which again is followed by a straight length of 492 mm pipe 97. Then follows a 90° bend 98 that has been rotated through 0° (i.e. points straight up), followed by a straight length of 500 mm pipe 99.

FIG. 16 depicts a flow chart showing a system for calculation of cut angles/angles of bending, rotational angles and lengths of pipes for stretches of piping. The system may for instance be implemented through a computer programme in a portable PC or a pocket computer.

Parameters have been input in advance, which parameters limit what may be constructed through bending or joining of pipe fittings (represented by the box 100). This may be a selection of bending radii for pipe bends, overall dimensions for end flanges, maximum bending radius for the available bending machine, the minimum gripping length of the bending machine, the maximum straight length of pipe that can be handled by the bending machine and other similar parameters. These parameters will as a rule have the same values from one time to the next but may be altered if the selection of pipe fittings changes or a new bending machine is obtained.

At 101 the user inputs parameters that are specific to the construction site. In a simple case, this is the available length in the x, y and z directions. A three-dimensional body 103 has been shown in order to illustrate this. It may however also be imagined that dimensions and the positioning of elements located within the three-dimensional body 103, such as strengthening rings or equipment, may be input. At 104, the user inputs additional site specific parameters; the direction of incoming pipes, defined in the x, y and z direction, and the direction of outgoing pipes in the x, y and z direction. Incoming pipes may for instance be a pump nozzle, and outgoing pipes may for instance be a pressure vessel nozzle. At 105 is illustrated an incoming pipe in the near lower corner 106, and an outgoing pipe in the far upper corner 107.

At 108, the operator states the preferred course for the stretch of piping. This may be expressed by giving the type of deviation. Maximum deviation is present when the length of the longest straight stretch of piping is as long as possible, i.e. when the angles of bending/cut angles of the bends are as small as possible. This case is illustrated by 109, by a bent stretch of piping 110. Here, there is a small length of pipe 111 before a bend 112. This because the bending machine has a certain gripping length represented by the length of pipe 111. The longest length of pipe is denoted 113, and is followed by a bend 114 and a small length of pipe 115. Minimum deviation is present when the length of the longest straight stretch of piping is as short as possible, i.e. when the angles of bending/cut angles of the bends are approximately straight. This case is illustrated by 116. Here, a short straight length of pipe 117 is followed by a 90° bend 118 and a straight length of pipe 119, which is again followed by a 90° bend 120 and a straight length of pipe 121. Selection of the type of deviation depends on several circumstances. If it is desirable to leave as much room as possible within the three-dimensional body 103, e.g. to be used for positioning of other equipment, as storage space or similar, it is sensible to choose minimum deviation. If this is not essential, but it is desirable to limit the total length of piping and avoid sharp bends, it is sensible to choose maximum deviation. An intermediate between maximum and minimum deviation can also be imagined. This may as an example be expressed as a percentage of maximum deviation.

Instead of expressing the desired piping course as a specification of deviation, it is also possible to define this parameter in a different manner, for instance by indicating a plan for the longest length of pipe or a desired cut angle/angle of bending for the first bend.

At 122 is shown an example of maximum deviation when the incoming pipe lies in the y direction and the outgoing pipe lies in the z direction.

When these parameters have been put into the system, the possible construction methods are checked out. As a rule, it is desirable to produce a stretch of piping by means of bending, as this requires less work, gives greater security against leaks and saves materials. The system therefore performs a calculation (illustrated by 123) in order to find out whether the stretch of piping can be bent. If this is not possible, a calculation is performed to find out whether is can be assembled from available parts. The result of this is communicated to the user via a display (illustrated by 124 and 125). The algorithms for performing these calculations are known per se, but are very long-winded when carried out manually.

The user then chooses (illustrated by 126) between bending and construction by means of parts. It is also possible to request a printout of the drawing of the piping course (illustrated by 127) from the system. In this case, the system not only calculates cut angles/angles of bending and lengths of pipes; it also calculates the rotational angle for each pipe bend. These parameters are added to the drawing, such that the pipelayer may easily bend or assemble a stretch of piping on the basis of the drawing (illustrated by 128). Instead of printing out the drawing on paper, it may obviously also be shown on a display. The parameters may also be transferred to a drawing programme and be used during construction.

Although the above essentially describes pipes and stretches of piping, the invention also comprises projection, production, bending and parts for other long and narrow circular cylindrical or approximately circular cylindrical bodies that are to extend from one location to another through one or more bends, branches or other, and where it is appropriate to apply the present invention.

When the word fittings is used in the above, this is taken to include bends, branching elements, saddles, armature and other components to be joined with the stretch of piping. As an example, it also includes flanges and nozzles integrated with pumps, filters and other components that are connected to the stretch of piping.

The invention is only limited by the following claims and equivalents of these. The term pipe will in this context be understood in a very general and wide sense, and comprises all bodies with a circular cylindrical or approximately circular cylindrical cross section and a certain longitudinal extent.

Although the principles of the present invention have in the above primarily been described in the context of piplaying onboard ships, the invention may naturally be used wherever pipes or pipe-like elements are to be joined in a specific configuration.

What is claimed is:

1. A method of projecting stretches of piping, in which the stretch of piping comprises at least a first piece of pipe and a second piece of pipe and a fitting connecting the first and second pieces of pipe, and in which the second piece of pipe is to be oriented in a defined direction from the fitting and the defined direction is to be given by giving a set of parameters of which parameters a cut angle ($\kappa$) of the fitting is one, comprising the steps of:

determining the defined direction of the second piece of pipe relative to the fitting by determining the cut angle ($\kappa$) of the fitting, and determining a rotational angle ($\delta$) of the fitting about a longitudinal axis of the first piece of pipe in relation to a defined spatial direction, so that the rotational angle ($\delta$) of the fitting becomes a parameter for the defined direction of the second piece of pipe; and indicating the rotational angle ($\delta$) of the fitting in a graphic illustration of a piping course.

2. The method according to claim 1, further comprising the step of deciding that the defined spatial direction is up in relation to the first piece of pipe.

3. A method of producing a stretch of piping, in which the stretch of piping comprises at least a fitting and a piece of pipe, comprising the steps of:

positioning the piece of pipe with one side oriented in a defined spatial direction;

fitting the fitting, which has a given cut angle ($\kappa$), to the piece of pipe;

rotating the fitting through a pre-determined rotational angle ($\delta$) relative to the defined spatial direction;

measuring the rotational angle ($\delta$) of the fitting in relation to the defined spatial direction; and thereby arranging the fitting in a pre-determined spatial direction defined by the cut angle ($\kappa$) and the rotational angle ($\delta$).

4. The method according to claim 3, further comprising the step of making a mark on that side of the piece of pipe which is to face in the defined spatial direction.

5. The method according to claim 3 or 4, further comprising the steps of:

making a mark on the fitting, orienting the mark in the defined spatial direction, and rotating the fitting about the longitudinal axis of the piece of pipe until the mark on the fitting is at an angular distance ($\delta$) from the mark on the piece of pipe that corresponds to the given rotational angle ($\delta$).

6. The method of claim 3, wherein the piece of pipe for production of at least parts of a stretch of piping comprises a mark along one side parallel with the longitudinal axis of the stretch of piping, the method further comprising the steps of:

assembling the piece of pipe with the which mark is to face facing in a defined spatial direction;

using the mark as a reference mark for a fitting that is fitted to the piece of pipe;

rotating the fitting through a pre-determined rotational angle ($\delta$) relative to the defined spatial direction; and measuring the rotational angle ($\delta$) of the fitting relative to the defined spatial direction.

7. The method of claim 3, wherein the fitting for joining with pieces of pipe or fittings for production of a stretch of piping, comprises two or more legs, and the fitting comprises a mark on each of the two or more legs, the method further comprising the steps of:

orienting the mark in a defined spatial direction upon assembly of the fitting;

using the mark as a reference mark for a second fitting or a piece of pipe;

fitting the second fitting or the piece of pipe to the fitting;

rotating the second fitting or the piece of pipe through a pre-determined rotational angle ($\delta$) relative to the defined spatial direction; and measuring the rotational angle ($\delta$) of the second fitting or the piece of pipe in relation to the defined spatial direction.

8. The method of claim 6 or 7, wherein further comprising the step of drawing, imprinting or scribing the mark is as a continuous line on the piece of pipe or the fitting.

9. The method of claim 3, further comprising the steps of:

providing a means of measuring an angle along the circumference of a piece of pipe or a fitting with a circular cross section; and providing a means of determining a reference plane, wherein the means of measuring an angle and the means of determining a reference plane comprise an electronic circuit with an electronic level and angle gauge.

10. The method of claim 3, further comprising the steps of:

determining a reference plane by using a tool comprising a means of determining a reference plane, measuring the rotational angle ($\delta$) relative to the reference plane, of a further piece of pipe or a further fitting to be connected to a first piece of pipe or first fitting, by using a tool comprising a means of measuring an angle along the circumference of a piece of pipe or a fitting with a circular cross section.

11. The method of claim 10, where the means of measuring an angle and the means of determining the reference plane comprise an electronic circuit with an electronic level and an electronic angle gauge.

12. The method of claim 3, the method further comprising the steps of:

employing a system for determining the choice of construction method and construction parameters when producing stretches of piping;

storing production limiting parameters in a first storage device of said system;

storing site specific parameters in a second storage device of said system;

storing optional parameters in a third storage device of said system;

establishing in an evaluation unit, on the basis of said parameters, whether or not the conditions are right for bending the stretch of piping or producing the stretch of piping from assembled parts;

determining in a calculation unit, on the basis of said parameters, the construction parameters for the stretch of piping; and displaying or printing bending/cut angles, and rotational angles and lengths.

13. The method of claim 12, wherein said further comprising the step of displaying or printing a graphic presentation including a straight line for each straight piece of pipe and a marking for each bend, said marking including the values for the bending or cut angle ($\kappa$) for said respective bend and the rotational angle ($\delta$) for said respective bend.

* * * * *